March 20, 1956 — H. W. ADDISON, JR — 2,738,807

LIQUID CONTROL VALVE

Filed July 20, 1949 — 2 Sheets-Sheet 1

Inventor
Harry W. Addison, Jr.
By Williamson & Williamson
Attorneys

March 20, 1956     H. W. ADDISON, JR     2,738,807
LIQUID CONTROL VALVE
Filed July 20, 1949     2 Sheets-Sheet 2
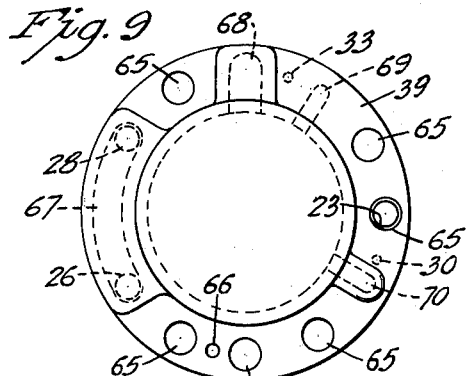
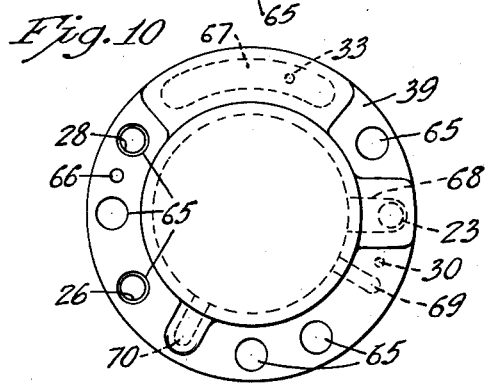
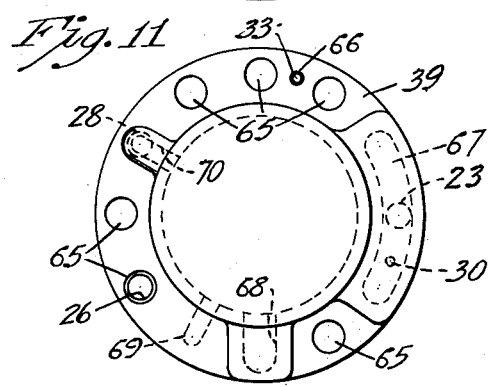
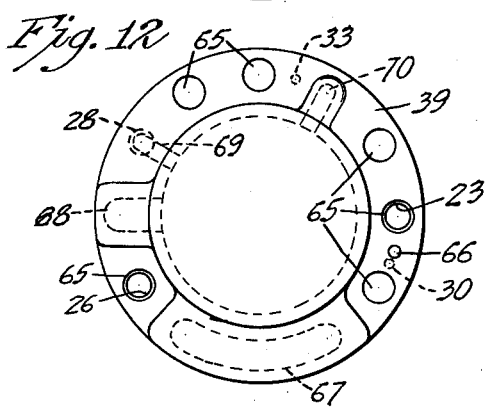
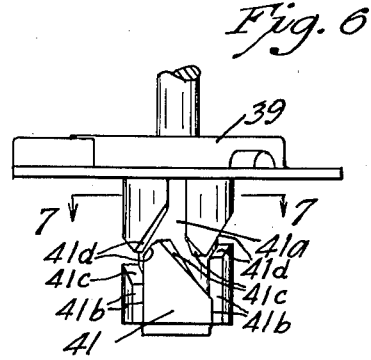
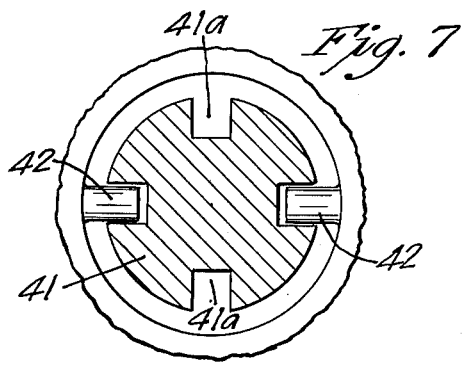
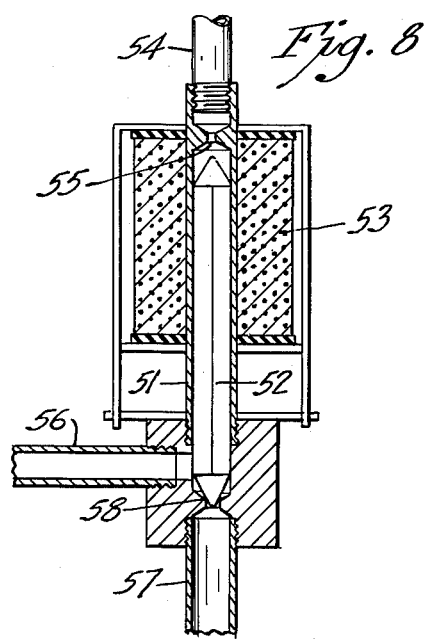
Inventor
Harry W. Addison, Jr.
By Williamson & Williamson
Attorneys

United States Patent Office 2,738,807
Patented Mar. 20, 1956

2,738,807

LIQUID CONTROL VALVE

Harry W. Addison, Jr., Marshall, Minn.

Application July 20, 1949, Serial No. 105,700

14 Claims. (Cl. 137—633)

This invention relates generally to liquid valves and particularly to a liquid valve adapted to be shifted successively to a plurality of positions to conduct a liquid successively to a plurality of conduits connected therewith.

It has been a problem, particularly in the water softening industry, to produce a completely automatic valve adapted to periodically regenerate the softener by a series of automatically operated cycles.

It is an object of my invention to provide a valve adapted to be actuated by a timing mechanism to proceed through a series of automatic cycles to successively shift from one position to another and conduct liquid from one conduit to another whereby a water softener may be completely automatically regenerated.

It is another object to provide a valve responsive for operation to pressure differentials within the casing thereof and having mechanism for controlling the operating pressure differential between certain portions of the casing.

It is a further object of my invention to provide a valve actuating piston working within a cylindrical casing and dividing the same into two chambers and having means for controlling the fluid pressure in said two chambers to produce shifting movement of the piston.

More specifically, it is an object to provide a valve-lifting piston working in a cylindrical casing to divide the same into a pair of chambers with mechanism for controlling the fluid pressure differential between said chambers, and a mechanism for rotating the valve member through a predetermined arc as the piston is reciprocated to shift said valve through a series of predetermined positions whereby a liquid may be directed successively to a plurality of liquid conduits.

These and other objects and advantages of my invention will more fully appear from the following description made in connection with the accompanying drawings wherein like reference characters refer to similar parts throughout the several views and in which—

Fig. 6 is a side elevational view of the rotary valve member and valve positioning cam;

Fig. 7 is a horizontal sectional view taken substantially along the line 7—7 of Fig. 6;

Fig. 8 is a central vertical sectional view of the solenoid valve for controlling the pressure differential between the two main valve chambers;

Fig. 9 is a diagrammatic view of the rotary valve member showing the relation thereof to the valve seat when said valve member is in soft water service position;

Fig. 10 shows the valve member relative to the valve seat when in back-wash position;

Fig. 11 shows the rotary valve member relative to the valve seat when in brine supplying position; and Fig. 12 shows the rotary valve member relative to the valve seat when in brine wash position.

Figure 1:
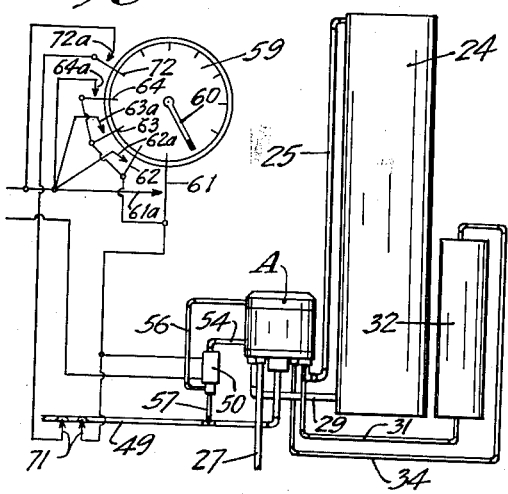
Fig. 1 is a diagrammatic view showing my valve as connected to a water softener system with a time clock and solenoid valve for actuating the same.
Figure 2:
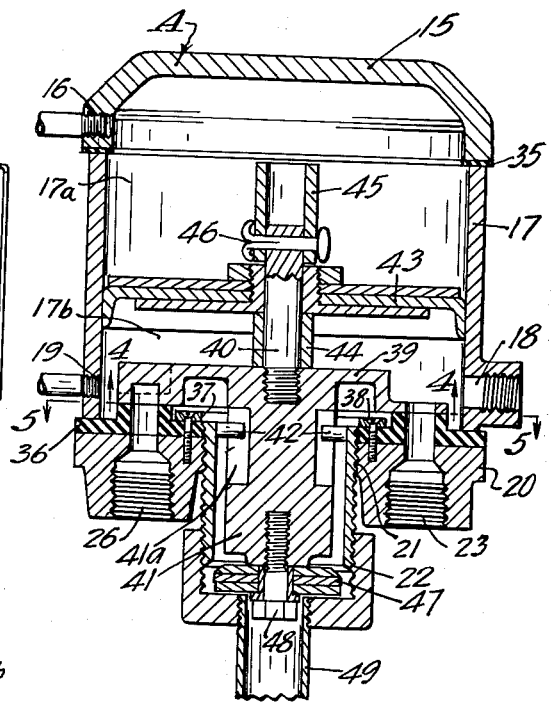
Fig. 2 is a vertical sectional view taken substantially along the line 2—2 of Fig. 3 and showing my pressure actuated valve.
Figure 3:
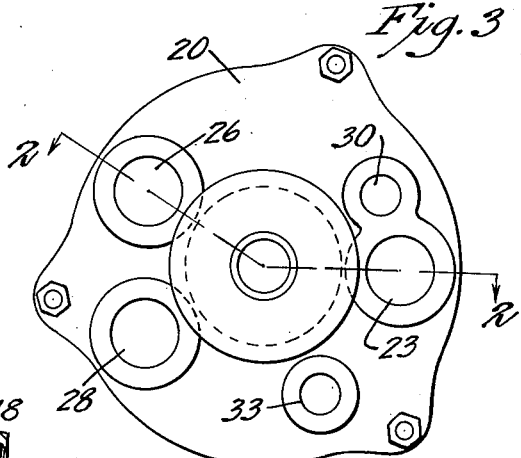
Fig. 3 is a bottom plan view of said valve.
Figure 5:
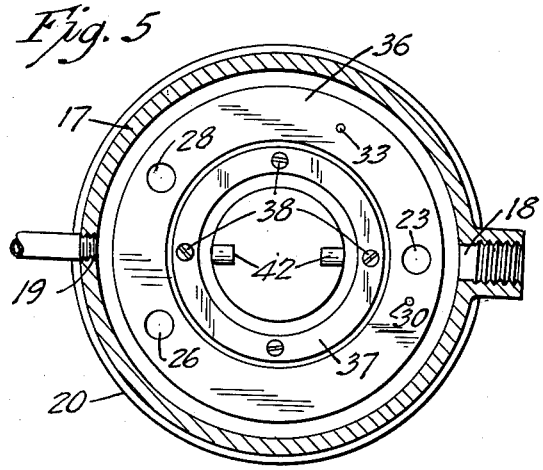
Fig. 5 is a horizontal sectional view taken substantially along the line 5—5 of Fig. 2 and showing the openings in the valve seat.

A pressure type water-softening system incorporating my automatically actuated valve is illustrated in Fig. 1. The main pressure responsive valve will be designated by the letter A. The main valve A is shown in vertical section in Fig. 2 and consists in a body including top cover 15 having the opening 16 therein, a cylindrical intermediate casing portion 17 having the inlet 18 and the opening 19 formed therein. An annular valve bottom is designated by the numeral 20 and has, in the form shown, a ported face having six openings or ports therein, including a central port connected to a point of low pressure waste disposal and a plurality of annularly spaced ports connected into the pressure system, as best illustrated in Figs. 2 and 3. A drain or waste opening 21 is formed in the central portion thereof and has a drain pipe 22 threadably connected therewith. An opening 23 is formed therein and is connected with the top of the softener unit 24 as by the conduit 25.

Another opening 26 formed in the bottom 20 is connected with the service line to the building as by the conduit 27, which normally delivers soft water therethrough. Still another opening 28 is formed in the bottom 20 and is connected to the bottom of the softener unit as by the conduit 29. A brine opening 30 is connected to a conduit 31 which extends from the bottom of a brine tank 32. A water supply outlet 33 formed in the bottom 20 is connected with the top of the brine tank 32 as by the conduit 34. The top 15 and the bottom 20 are firmly connected in sealed relation to the top and bottom of the cylindrical casing 17 and have suitable resilient gaskets 35 and 36 respectively forming the seal between the parts. Both gaskets 35 and 36 are in the form of annular rings, and the gasket 36 extends inwardly across the ported face of the annular bottom member 20, and a retaining ring 37 securely holds the inner marginal portion thereof to said valve bottom 20 as by a plurality of circumferentially spaced screws 38. This gasket 36 has a raised inner portion which has a flat top surface and forms a resilient and compressible valve seat. The openings 23, 26, 28, 30 and 33, all extend up through the raised seat portion of said gasket 36, as shown in Fig. 2.

A reciprocable valve member or rotor 39 having an annular flange 39a and an inner central chamber 39b is mounted to sealingly engage said seat when in lowered position, as best shown in Fig. 2. A central spindle or stem 40 is fixed to the valve member 39 as by being threaded thereto, and extends upwardly therefrom. A cam member 41 is fixed to the bottom of said valve and extends downwardly therefrom. This cam member 41 has, in the form shown, interconnected substantially V-shaped grooves 41a in which a pair of opposed camming pins 42 ride, as best shown in Figs. 2, 6 and 7. At the bottom of each V-shaped groove 41a, a vertically disposed access slot 41e is provided to facilitate assembling and disassembling of the parts. A fluid pressure responsive means comprising an upper valve actuating piston 43 is fixed to the spindle 40 in slightly spaced relation above the valve 39. In the form shown, a spacer sleeve 44 is interposed between piston 43 and valve 39 and a retaining sleeve 45 holds the piston 43 against said sleeve 44, as by the retaining pin 46, which extends through spindle 40 and sleeve 45, as shown in Fig. 2. The space between the upper extremity of sleeve 45 and the underside of the cover 15 is such that the vertical shifting movement of the piston, cam and shank assembly, will be limited and the cam 41 will thus be prevented from sliding upwardly off the pins 42 and the slots 41a will be maintained on the pins 42. A lower piston valve 47 is fixed at the bottom of cam 41 as by the cap screw 48 and normally opens the drain conduit 49 as best shown in Fig. 2.

The upper piston 43 divides the main valve casing into two chambers, an upper control chamber 17a and a lower rotor chamber 17b, and a pilot valve such as solenoid valve 50 is provided to control the relative pressures between said two chambers. Said solenoid valve consists in a cylindrical, non-ferrous tubular guiding member 51 and has a ferrous metallic plunger 52 mounted for longitudinal shifting movement therein. A suitable coil 53 of electrical conductive wire is wound around said guide 51 to lift said plunger and positively project the same upwardly. The upper end of the non-ferrous tubular guide 51 is connected with the lower chamber of casing 17 through opening 19 as by a conduit 54, and a valve seat 55 is formed at the upper end of guide 51. A conduit 56 connects the lower portion of the tubular guiding member 51 with the upper chamber of casing 17 and a drain conduit 57 connects drain pipe 49 with the lower extremity of the tubular guiding member 51 at a point disposed in slightly spaced relation below the connection of conduit 56 which is vertically aligned with the valve seat 55 at the top of said guiding member 51. A valve seat 58 is formed at the connection of conduit 57 and guiding member 51, and the ferrous metallic plunger, being of polygonal shape to permit the flow of water therearound, and having tapered ends thereon, is adapted to sealingly seat itself in valve seat 58 when in normal position and is adapted to be projected upwardly into valve seat 55 when said solenoid 50 is energized.

Any suitable means may be provided for energizing the solenoid 50, such as the time clock 59 which is adapted to periodically close the circuit through the solenoid 50 to project plunger 52 upwardly into valve seat 55 to release the pressure of the liquid supply to shift piston 43 upwardly along with valve member 39 and cam 41, whereby said cam 41 is rotated which, in turn, rotates valve member 39 through a similar arc. Normally, the plunger 52 is sealingly seated in valve seat 58 which closes off conduit 57, but permits communication between the two chambers in the casing 17 and thus equalizes the liquid pressure in said two chambers. Since a part of the lower face of the rotor 39 is subjected to atmospheric or other lower pressure at the member 39b and the lower side of valve 47, through the drain or low pressure port 21 and drain pipe 22, the fluid pressure in the rotor chamber 17b holds the rotor against its seat with the pins 42 disposed between the axially extending faces 41b of the cam. However, as soon as the pressure is released from the upper chamber, said piston will be forced to shift upwardly as described. As the piston and rotor move upward the cam faces 41b cause the rotor to move only axially for a short distance until the compression of the gasket 36 is relieved and the rotor may turn without damage thereto. Thereupon the helical faces 41c engage the cam pins causing the rotor to turn, in the form shown, through 45° during the balance of the upward movement of the piston, rotor and cam. Upon deenergization of the solenoid, the valve plunger 52 will again seat itself in seat 58 and permit the pressure in the two chambers to be again equalized, and the pressure of the flow of water downwardly through the drain pipe 22 against the lower piston valve 47 draws the valve 39 toward its seat and as the valve 39 approaches said seat, the piston valve 47 will be shifted downwardly below conduit 21 and the pressure against the top of valve 39 will snap the same downwardly against its seat. During this downward movement cam faces 41d engage the pins causing the cam and rotor to turn through a further 45° prior to any compression of the gasket, after which the cam enters between the next pair of cam faces 41b preventing any further rotation of the rotor as it moves to seated position in which the gasket 36 is compressed by fluid pressure acting on the rotor 39.

Any conventional electric switch, such as the timer switch 59, can be used. In the timer 59, which is illustrated in Fig. 1, a moving hand 60 is adapted to engage a resilient contact member 61 and shift the same into engagement with a stationary contact 61a and thereby close the circuit through the solenoid 50. When the hand 60 moves past the resilient contact 61, said contact will snap back and immediately break the circuit. While the solenoid is energized, the piston 43, valve member 39 and piston 47 will be reciprocated upwardly and downwardly to permit the cam, in the form shown, to rotate the valve member 39 through a 90° angle relative to the valve seat of member 36.

Resilient contacts 62, 63 and 64 are provided in circumferentially spaced relation around the face of the timer 59 and are normally spaced from their respective stationary contacts 62a, 63a and 64a. Each of the stationary contacts is electrically connected with one line of a suitable source of electric power and the other line of said electric power source is electrically connected to one end of the solenoid winding 53. The other end of the solenoid winding 53 is connected electrically to the resilient shiftable contacts 61, 62, 63 and 64 to permit the circuit through the solenoid to be closed when said shiftable contacts engage the respective stationary contacts. The space between the substantially radially disposed resilient contacts determines the length of each cycle of operation in the regenerating process.

Figure 4:
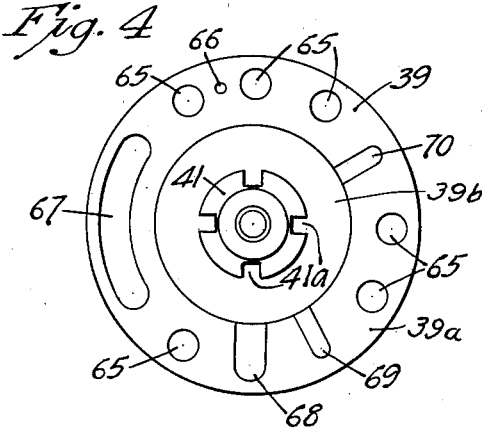
Fig. 4 is a horizontal sectional view taken substantially along the line 4—4 of Fig. 2 and showing the openings in the rotary valve member.

As best shown in Fig. 4, the valve member 39 has a plurality of spaced, relatively large, circular openings 65, and a single smaller opening 66 formed through the flange thereof. In addition to these openings, an elongated intercommunication chamber 67 is circumferentially formed in said flange, as well as the radially disposed drain outlet passages 68, 69 and 70, passage 69 being materially restricted to retard the flow therethrough. Each of these passages 68, 69 and 70 communicate with the central drain opening 21 and pipe 22.

Figs. 9, 10, 11 and 12 show the valve member 39 in its four rotated positions on the valve seat of gasket 36. Fig. 9 shows said valve in soft water service position with the opening 28 in the valve seat which is connected to the bottom of the softener, communicating with the opening 26 which is connected to the service line 27 of the building by the elongated chamber 67. The water supply entering the bottom chamber of the valve casing 17 through opening 18 passes downwardly through one of the openings 65, which is aligned with the opening 23, which is connected to the top of the softener by conduit 25. Actually, the openings 23, 26 and 28 in the valve seat are of substantially the same diameter as the openings 65 in the valve member 39, but for purposes of clarity in the drawing of Figs. 9 through 12, the openings in the valve seat are shown as somewhat smaller to permit illustrating the alignment of said openings with the openings of the valve member 39. None of the other openings of the valve member 39 are aligned for any functional purpose with any of the other openings in the valve seat when the valve is in service position, as shown in Fig. 9.

In the form shown, the back wash flow to clean out collections in the softening material within the softener is directed upwardly therethrough, and Fig. 10 shows the valve member 39 in back wash position. Opening 28 to the softener bottom is aligned with one of the openings 65 of valve 39 and permits water to be carried from the lower chamber and inlet 18 to the bottom of the softener while opening 23 is connected with the drain opening 21 by the radially disposed passage 68. The opening 26 to the service line is aligned with one of the openings 65 and provides hard water for the service line during the regenerating operation.

Fig. 11 shows the valve 39 in brine supplying position with the smaller opening 66 aligned with the small opening 33 to supply water to the top of the brine tank, and the elongated passage 67 affords communication between the opening 30 from the bottom of the brine tank and opening 23 to the top of the softener. Opening 28 from the bottom of the softener is conneccted to the drain by the restricted passage 70 to produce a slight pressure within the softener and insure sufficient "salting" thereof. Service opening 26 is aligned with one of the openings 65 to supply hard water to the service line during the salting operation.

In Fig. 12, the valve member 39 is shown in brine washout position during which cycle the brine is washed out of the softening material in the softener by running water downwardly through said softener. The opening 23 connected to the top of the softener is aligned with one of the apertures 65 to supply water to said softener top, and the opening 28 from the softener bottom is connected to the drain through passage 69. The service opening 26 is aligned with one of the apertures 65 to provide water for the service line during this cycle of the regenerating operation. From the position shown in Fig. 12, the valve member 39 is rotated back into service position as shown in Fig. 9, where it remains until the time clock 59 again actuates the piston 43 to produce another series of regenerating cycles.

An automatic testing device is provided in the drain pipe 49 and consists in a pair of spaced contacts 71 which are electrically insulated from the pipe 49 and extend a substantial distance into the hollow portion thereof from the bottom. Unless water is flowing through the pipe 49, the two spaced contacts 71 open the circuit through said contacts. One contact is electrically connected with one end of the solenoid winding 53 and the other contact 71 is electrically connected with a resilient contact 72 disposed radially of the timer and adapted to be engaged by the moving hand 60 of said timer 59. The stationary contact 72a is mounted in normally spaced relation from the resilient contact 72 and is electrically connected to the one line of the electric power source, the other line being connected electrically to the other end of the solenoid winding, as previously described. When the three regenerating cycles have been completed and the valve 39 is in service position, there will be no water flowing through the drain pipe 49 and, therefore, the circuit through the two contacts 71 cannot be closed if said valve 39 were in service position, or, in other words, if the valve 39 failed to be shifted during one energization of the solenoid 50. Therefore, as a check on the completion of all of the regeneration cycles, the fifth shiftable contact 72 is provided to close the electrical circuit down to the spaced contacts 71 which will only complete the circuit to the solenoid if there is water flowing through the pipe 49. In the event that there is water flowing through said pipe, the solenoid will be energized and the valve member shifted to its next position. Only one contact is shown, but it is, of course, understood that a number of these testing contacts could be provided to absolutely insure completion of all of the cycles.

It will be seen that I have provided a highly efficient valve unit adapted to be periodically operated by a suitable electric switch such as the timing device, which is particularly adapted for a water softening system to automatically regenerate the softener at predetermined intervals. The valve unit has a wide variety of uses and any number of openings can be provided in the valve seat, as well as in the valve member 39. The close cooperation between the piston and the cam to the position of the valve member 39 is an important feature of my invention. Also, the combination of the valve piston and the solenoid valve is important to the operation of my mechanism.

It will, of course, be understood that various changes may be made in the form, details, arrangements and proportions of the parts without departing from the scope of my invention.

What I claim is:

1. A liquid control valve for controlling liquid flow to a multiplicity of conduits, said valve comprising a casing having a closed end, an annular valve seat formed at the other end of said casing and providing a drain outlet opening through the open central portion thereof, said annular valve seat having a multiplicity of peripherally spaced openings formed therein, a valve member including a central closure element and an annular flange element fixed in sealed relation around said closure element, said flange element having a multiplicity of passages formed therein and being adapted to be seated in sealed relation against said annular seat to position said central closure across the drain outlet and close the same, certain of said passages being radially disposed to afford communication between the central drain opening and the openings in said seat respectively aligned with said passages, mechanism for intermittently rotating said valve member through a predetermined arc to change the relation between the passages therein and the openings in said seat, and means in said casing for connection with a source of liquid under pressure.

2. The structure set forth in claim 1, said casing having a cylindrical conduit sealingly connected in the central opening through said seat, a piston connected to said valve member and working in said drain conduit to urge said valve member downwardly against said seat when liquid is flowing through said conduit.

3. The structure set forth in claim 2, and means in said conduit disposed beyond said piston for automatically indicating any flow through said drain conduit.

4. A multiport lift turn valve comprising in combination a body having a chamber and a ported face therein provided with a plurality of ports, a rotor in said chamber cooperable with the ported face to effect different communication between the body ports in each of a plurality of different rotative positions of the rotor, fluid pressure responsive means connected to the rotor to effect translatory movement of the rotor toward and away from the ported body face in response to differences of fluid pressure on opposite sides of the pressure responsive means, means for preventing rotation of the rotor during the initial portion of its movement away from the body face and the final portion of its movement toward the body face, and means for turning the rotor during the course of its translatory movement.

5. A multiple port lift turn plate type valve comprising in combination, a body having a chamber and a ported face therein provided with a plurality of ports, a ported rotor in said chamber cooperable with the ported face to effect different communication between the body ports in different rotative positions of the rotor, fluid pressure responsive means connected to the rotor spanning said chamber and dividing the same into a control chamber and a pressure chamber, a connection for supplying fluid under pressure to the pressure chamber for passage through the valve and for actuating the pressure responsive means in one direction to move the rotor in translation away from the ported face and unseat the rotor upon the occurrence of reduced pressure in the pressure chamber, means for controlling the fluid pressure in the control chamber to move the pressure responsive means and thereby effect translation of the rotor in unseating and seating movement, and means operative in response to movement of the pressure responsive means for rotating the rotor.

6. A multiple port lift turn plate type valve comprising in combination, a body having a chamber and a ported face therein provided with a plurality of ports, a ported rotor in said chamber adapted to seat in cooperative relationship with the ported body face in a plurality of different rotative positions to effect different communication between the ports, compressible gasket means interposed between the rotor and the ported body face, fluid pressure responsive means connected to the rotor spanning said chamber and dividing the same into a control chamber and a pressure chamber, a connection for supplying fluid under pressure to the rotor chamber for passage through the ports, said fluid acting to hold the rotor seated and compress the gasket means, means for controlling the fluid pressure in the control chamber to effect movement of the pressure responsive means to drive the rotor in translatory unseating and seating movement, and cam means operative by the pressure responsive means for turning the rotor while unseated.

7. The combination recited in claim 6 wherein the cam means comprises a cam and pin connection acting between the body and the rotor, the cam having faces disposed in an axial direction with respect to the rotor positioned to confine the initial portion of unseating movement of the rotor and the final portion of reseating movement to an axial direction, and angularly disposed faces for turning the rotor while unseated.

8. A multiport lift turn plate type valve for controlling the liquid flow in a pressure type closed system water treatment apparatus having a plurality of high pressure conduits and a low pressure waste conduit comprising in combination a body having a chamber and a ported face therein, the ported face having a plurality of annularly spaced ports for connection to the high pressure conduits of the system and a central waste port for connection to the low pressure waste conduit, a connection for supplying liquid under pressure to said chamber for distribution by the valve, a ported rotor in said chamber adapted to seat in cooperative relationship with the ported body face in a plurality of different rotative positions to effect different communication between the ports, the rotor having a port extending therethrough for passage of liquid from the chamber to certain of the body ports in certain positions of the rotor and having a radially disposed passage for connecting annularly arranged body ports to the central port in certain positions of the rotor, a compressible gasket interposed between the rotor and the ported body face to seal the ports, means for moving the rotor in unseating movement away from the body face to relieve compression on the gasket, for turning the rotor and for reseating the same in another of said positions, and means for closing the central waste port in response to unseating movement of the rotor and reopening the same in response to reseating movement of the rotor.

9. A multiple port lift turn valve comprising a hollow body defining a compartment therein closed at one end thereof, a valve seat formed in said compartment in spaced relation to the closed end thereof and having a plurality of circumferentially spaced ports formed therein, a valve rotor shiftably mounted for both reciprocating and rotary movement in said compartment and having a ported face for engagement with said ported valve seat to permit different communication between the ports in said seat to be effected by a plurality of different rotative positions of the valve rotor when engaged with said seat, a pressure-responsive member interposed in spaced relation between the valve rotor and the closed end of said compartment to divide said compartment into two chambers and having at least a portion thereof shiftable to enlarge one or the other of said chambers with the shiftable portion of said member being connected to the rotor to cause reciprocation thereof toward and away from the ported valve seat when a pressure differential is produced between said two chambers, means associated with at least one of said chambers for controllably producing a pressure differential therebetween to thus effect a reciprocating movement of said pressure-responsive member, a stop mechanism positively preventing rotation of said rotor while the same is pressed against said valve seat, and apparatus connected with said rotor and responsive to a portion of the reciprocating movement thereof to produce a predetermined increment of rotation in said valve rotor during the reciprocating movement thereof and only after removal of the pressure of the rotor from the valve seat.

10. A multiple port lift turn valve comprising a hollow body closed at one end thereof and defining a compartment therein with a ported valve seat formed in said compartment in spaced relation to the closed end thereof, a rotary valve element mounted for reciprocal as well as rotary movement in said compartment and having a ported face for selected registered engagement with said ported valve seat to produce a selected communication arrangement between the ports in said seat in each of a plurality of different seat-engaging rotative registrations of said rotary valve element, a pressure-responsive member interposed in spaced relation between the rotary valve element and the closed end of said compartment and having at least a portion thereof shiftable within said compartment in response to differences in fluid pressure on opposite sides thereof and connected with said valve element to produce reciprocation thereof both toward and away from said valve seat, a pilot valve selectively settable to vary the pressures on opposite sides of said member and effect reciprocating movement of said valve element, a sliding cam mechanism having a stop portion positively preventing rotation of said valve element while the same is engaged with said valve seat and producing in response to reciprocating movement of said valve element a predetermined increment of rotation in said element only after disengagement thereof from the valve seat.

11. A valve of the multiple port lift turn type comprising a body having a chamber and a ported face therein, the ported face having a central outlet port and a plurality of annular ports spaced annularly around the outlet port, a connection for supplying liquid under pressure to said chamber for distribution by said valve, a rotor in said chamber rotatable about a central axis having a central portion shaped to close the body outlet port in the seated position of the rotor and a plurality of ports spaced around the axis, the rotor being adapted to seat in cooperative relationship with the ported body face in a plurality of different relative positions to effect different communication between the ports, a fluid pressure-responsive means connected to the rotor at its central axis to effect translatory movement of the rotor toward and away from the ported body face in response to differences of fluid pressure on opposite sides of the pressure responsive means, means for preventing rotation of the rotor during the initial portion of its translatory movement away from the body and the final portion of its translatory movement toward the body face, and means for turning the rotor during the course of said translatory movement.

12. A valve of the multiple port lift turn type comprising a body having a chamber and a ported face therein, the ported face having a central outlet port and a plurality of annular ports spaced annularly around the outlet port, a connection for supplying liquid under pressure to said chamber for distribution by the valve, a rotor in said chamber rotatable about a central axis having a central portion shaped to close the body outlet port in the seated position of the rotor and a plurality of ports spaced around the axis, the rotor being adapted to seat in cooperative face to face relationship with the ported body face in a plurality of different rotative positions to effect different communication between the ports, a spindle attached to the rotor at said central axis, a compressible gasket interposed between the rotor and the body face to seal the ports, compressed therebetween by the pressure of the liquid in said chamber, fluid pressure-responsive means connected to the spindle to effect translation of the rotor toward and away from the body face in response to differences of fluid pressure on opposite sides of the pressure-responsive means, and means for turning the rotor during the course of said translation subsequent to the removal of pressure of the rotor on the gasket and prior to the reapplication of pressure between the rotor and the gasket to move the rotor between successive seated positions.

13. A valve of the multiple port lift turn type comprising a body having a chamber and a ported face therein, the ported face having a central outlet port and a plurality of annular ports spaced annularly around the outlet port, a connection for supplying liquid under pressure to said chamber for distribution by the valve, a rotor in said chamber rotatable about a central axis having a central portion shaped to close the body outlet port in the seated position of the rotor and a plurality of ports spaced around the axis, the rotor being adapted to seat in face to face cooperative relationship with the ported body face and a plurality of different rotative positions to effect different communication between the ports, a spindle connected to the rotor at said central axis and extending outwardly therefrom, fluid pressure responsive means connected to the spindle, spanning said chamber and dividing the same into a pressure chamber communicating with said supply connection and a control chamber, means to control the fluid pressure in the control chamber to effect translation of the rotor toward and away from the ported body face in response to movement of the pressure responsive means, and means for turning the rotor between successive positions during the course of said translatory movement.

14. The structure set forth in claim 13 wherein the last-mentioned means comprises a cam and pin connection disposed between the body and the rotor for moving the rotor stepwise between four seated positions disposed at 90 degrees with respect to each other.

References Cited in the file of this patent

UNITED STATES PATENTS

| | | |
|---|---|---|
| 620,829 | Batchelor | Mar. 7, 1899 |
| 998,543 | Meyer | July 18, 1911 |
| 1,272,384 | Conrader | July 16, 1918 |
| 1,387,101 | Candee | Aug. 9, 1921 |
| 1,842,382 | Arey | Jan. 26, 1932 |
| 2,235,287 | Daniels | Mar. 18, 1941 |
| 2,315,223 | Riche | Mar. 30, 1943 |
| 2,368,832 | Hauser | Feb. 6, 1945 |
| 2,371,498 | Boynton | Mar. 13, 1945 |
| 2,428,410 | Daniels | Oct. 7, 1947 |
| 2,582,333 | Horodeck | Jan. 15, 1952 |

FOREIGN PATENTS

| | | |
|---|---|---|
| 660,750 | Germany | of 1938 |